April 5, 1927.
H. A. LOCKWOOD
BAKING PAN
Filed May 29, 1925
1,623,692
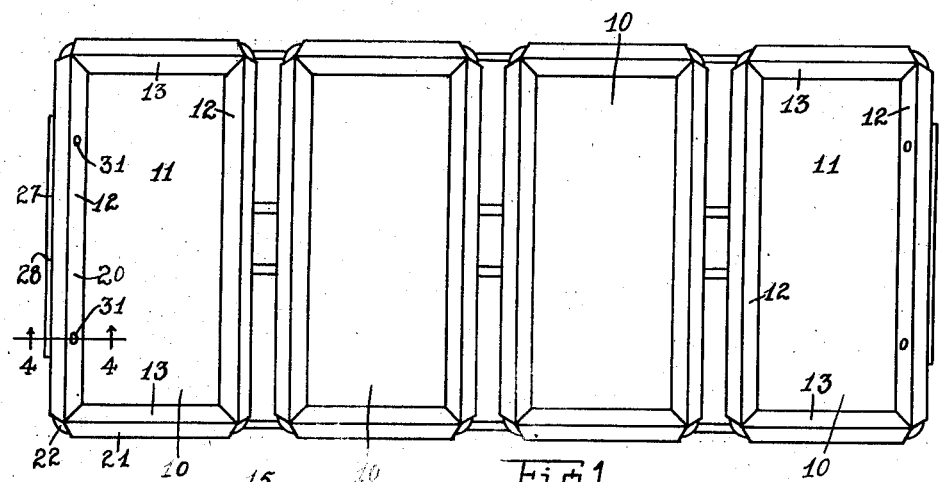
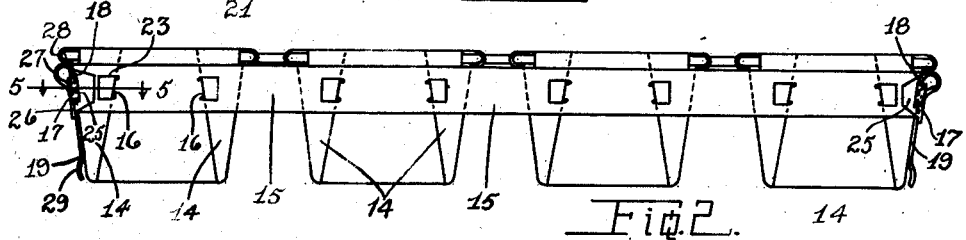
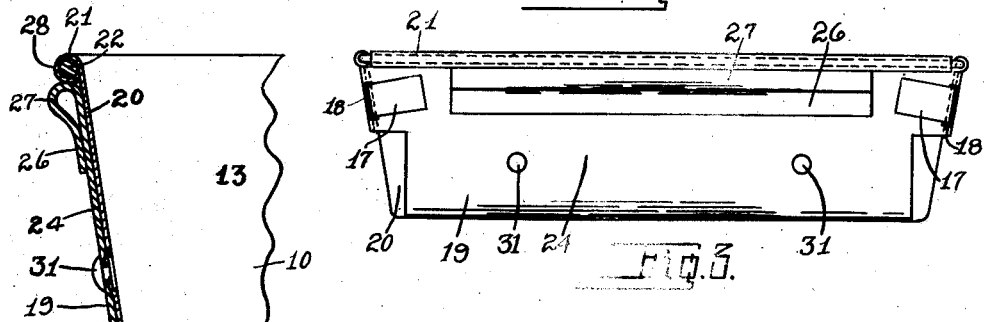
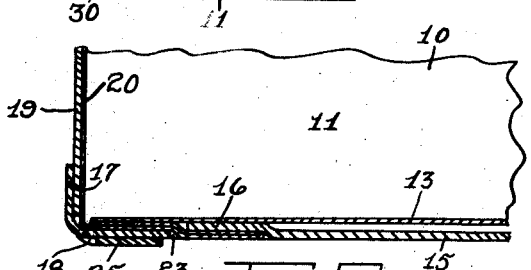
Inventor
HARRY A. LOCKWOOD,
By Murray and Gugelter
Attorneys Patented Apr. 5, 1927.

1,623,692

UNITED STATES PATENT OFFICE.

HARRY A. LOCKWOOD, OF CINCINNATI, OHIO, ASSIGNOR TO THE LOCKWOOD MANUFACTURING COMPANY, OF CINCINNATI, OHIO, A CORPORATION OF OHIO.

BAKING PAN.

Application filed May 29, 1925. Serial No. 33,814.

My invention relates to improvements in baking pans and especially to that class of baking pans used in bakeries for making bread.

An object of my invention is to provide a shock absorber or protecting shield for the end of a set of baking pans.

Another object of my invention is to provide a device that will withstand blows usually directed against a side and upper edge of the end pan of a set of baking pans.

Another object of my invention is to provide a device that is economical to make and easily mounted in place.

These and other objects are attained by the means described herein and disclosed in the accompanying drawings, in which:

Fig. 1 is a top plan view of a set of baking pans having mounted thereon a device of my invention.

Fig. 2 is a side elevation of the pans shown in Fig. 1.

Fig. 3 is an end elevation of the pans shown in Figs. 1 and 2.

Fig. 4 is an enlarged sectional view taken on line 4—4 of Fig. 1.

Fig. 5 is an enlarged sectional view taken on line 5—5 of Fig. 2.

My invention contemplates a series of pans 10, usually four, which are placed in spaced relation one to the other to permit heat to act upon the sides of the pans in order to attain even baking of the bread. The pans are located side by side, are spaced equal distances apart, and extend parallel to each other. Each of the pans 10 comprise a bottom 11, sides 12 and ends 13. The ends 13 have overlapping folds 14 which tend to strengthen pans at the corners.

The pans 10 are secured together by means of binding strips 15 extending across the opposite ends of the pans of the series, and each strip is permanently secured to each pan. Each strip is provided with a plurality of pairs of pan engaging lugs 16, which are located in alignment with each other and which are preferably stamped or cut from the metal of the strip. The pair of lugs 16 are provided on each strip for engaging each pan of the series, and the lugs of each pair extend in opposite directions and are adapted to engage the folds 14 of the pans, as disclosed in Fig. 5. An extension or lug 17 is provided at the ends of each strip 15 which passes through an opening or perforation 18, formed in a shield plate or bumper 19 carried by the outer side 20 of the end pans of the series. The lugs 17 are bent upon the shield plate or bumper 19 and serve the double purpose of securing the bumper 19 in place as well as retaining the strips 15 in position. The pans 10 are preferably constructed in the ordinary manner from a single sheet of metal having the overlapping folds 14. The folds 14, however, are not pressed down into position until after the strips 15 are in place. The edges of the folds, as is usual on pans so constructed, converge toward the tops of the pans 20 and the lugs 17 of each pair are so spaced that their ends may be introduced under the edges of the oppositely disposed folds, near the bottom of the pan. After the strips 15 are so positioned they are moved vertically along the pans until the upper edges of the strips are adjacent the lip 21 formed on the pans 10. The lip 21 is formed by bending the upper edges of the pans 10 around a wire or rod 22. After the binding strips 15 have been located adjacent the lip 21, with the folds 14 of the pans extending over the oppositely disposed lugs 17, the strips are permanently secured in place by pressing the said strips 15 toward the pans 10, so as to force a portion of the folds into the perforation or opening 23 in the strips 15, as shown in Fig. 5. The perforation or opening 23 results from the stamping or cutting of the lug 17 from the strip 15.

The outer side 20 of the end pans is frequently subjected to blows, by bakers, in ejecting baked bread from the pans. These blows cause the sides 20 to be bent inwardly or indented and when a number of sets of pans are nested, the tin is rubbed or scraped from the inside surface of the pans 10, thus exposing the base metal of the pans. When the tin is thus rubbed off, the exposed metal would blacken that part of the loaves of bread which comes in contact with the exposed or untinned metal. In order to overcome this condition, I locate, as stated above, a reenforcing plate or shock absorber 19 upon the outer surface of the side 20 of the end pans. The shock absorber 19 comprises a body portion 24 of sufficient width and length to approximately cover the outer surface of the side 20 of the end pan. The body portion 24 is provided with lugs or ears 25 which are bent at approximately right angles to the body portion 24 and overlap the binding strips 15. As stated previously, the shock absorber is provided with perforations or openings 18 through which extend lugs 17 of the strip 15. The lugs 17 are bent at right angles to the strip 15 and lie upon the body portion 24 of the shock absorber and serve as an additional securing means for the said shock absorber. The upper edge of the body 24 is bent upon itself, adjacent the lip 21 of the pan, whereby an apron or reenforcing bar 26 is provided. Intermediate the apron 26 and body 24 of the reenforcing strip 20 a bumper or bead 27 is formed. The bead 27 extends beyond the extreme edge 28 of the pans, see Fig. 4. The apron 26 and bead 27 are so constructed as to act as a spring or shock absorber when blows are directed against the top or the end of the pans. It should be noted that the bead is located adjacent the lip 21 and that a blow directed against the top of the pan would be absorbed by the bead 27. It should be further noted that the bead 27, extending beyond the edge 28 of the pans, would receive and resist blows directed against the said end of the pans. The lower end of the body portion 24 is crimped whereby a second bead 29 is provided. This bead 29 stops short of the side of the pan and is somewhat resilient. When the bakers peel, employed in lifting the pans out of a baker's oven, strikes the pans near the bottom thereof, the shock is absorbed by the bead 29. The bead 29 is provided with a curved portion 30. The curved portion 30 is utilized for assisting the baker in passing his peel beneath the pans. Rivets 31 are employed, in conjunction with the lugs 16 carried by the binding strips 15 and the ears 25 carried by the body 24, for securing the reenforcing plate or shock absorber 19 on the outside 20 of the end pan. It should be noted that flat headed rivets are employed so that the interior surface of the side 20 of the end pans is perfectly flat thereby insuring a loaf of bread with no unsightly or unsanitary marks thereon.

The reenforcing plates or shock absorbers are preferably made from somewhat heavier material than the pans to make them sufficiently strong to withstand the blows directed against the sides of the pan.

What I claim is:

1. In a device of the class described, the combination with a baker's bread baking pan comprising a side having a lip at the upper edge thereof, of a protecting shield comprising a body portion having an upper and lower edge, a shock absorber formed at the upper edge of the body portion and adjacent the lip, the shock absorber extending beyond the edge of the lip formed on the pan, an apron integral with the shock absorber, a resilient bead formed at the lower edge of the body portion, and means for mounting the protecting shield on the side of the pan.

2. In a device of the class described the combination with a baker's bread baking pan comprising a side having a lip at the upper edge thereof, of a protecting shield comprising a body of sufficient size to substantially cover the side of the pan and having an upper and lower edge, a shock absorber formed at the upper edge of the body portion and adjacent the lip and extending beyond the outer edge of the lip, a reenforcing bar integral with the shock absorber, and means for mounting the protecting shield upon the side of the pan.

3. A shock absorber for mounting upon the side of a baker's bread baking pan comprising a body portion of a size to substantially cover the side of a bread baking pan and having an upper and lower edge, a shock absorber formed on the upper edge of the body portion and extending beyond the outer edge of the pan, a reenforcing bar integral with the shock absorber and overlapping the body portion, ears formed on the body portion and extending at right angles thereto for clamping on the ends of the pan, a resilient bead formed on the body portion at the lower edge thereof, and means for mounting the protecting shield on the side of the pan.

4. In a multiple baking pan the combination with the end walls of the pan of a plate having a bead at its upper end, and an apron depending from the bead and contacting the plate, the plate attached to and extending over the extreme end walls of the pans, the bead extending transversely of the plate and underlying and abutting the upper edge of the pan and adapted to receive blows directed against the pan.

5. A protecting shield comprising a body portion having an upper and a lower edge, a reinforcing bar carried by the upper edge of the body portion and slidably contacting the body portion, a resilient bead intermediate the body portion and the reinforcing bar adapted to receive blows directed against the body portion, the reinforcing bar yieldingly shifting its position upon contact of the bead with a foreign object, a flexible bead formed at the lower end of the body portion adapted to ward off blows directed against the shield, and attaching ears carried by the sides of the shield.

6. A protecting shield comprising a body portion having an upper and a lower edge, a reinforcing bar carried by the upper edge of the body portion and slidably contacting the body portion, and a resilient bead intermediate the body portion and the reinforcing bar adapted to receive blows directed against the body portion, the reinforcing bar yieldingly shifting its position upon contact of the bead with a foreign object.

7. A protecting shield for bread baking pans comprising a body portion having the upper edge thereof bent upon itself to form a reinforcing bar and slidably contacting the body portion, and a resilient bead connecting the reinforcing bar and body portion and extending beyond the outer surface of the reinforcing bar and body portion.

In testimony, whereof, I have hereunto subscribed my name this 26th day of May, 1925.

HARRY A. LOCKWOOD.